Dec. 14, 1937.  A. SCHWARZ  2,102,487
DEFROSTING SCREEN
Filed Sept. 27, 1935   3 Sheets-Sheet 1
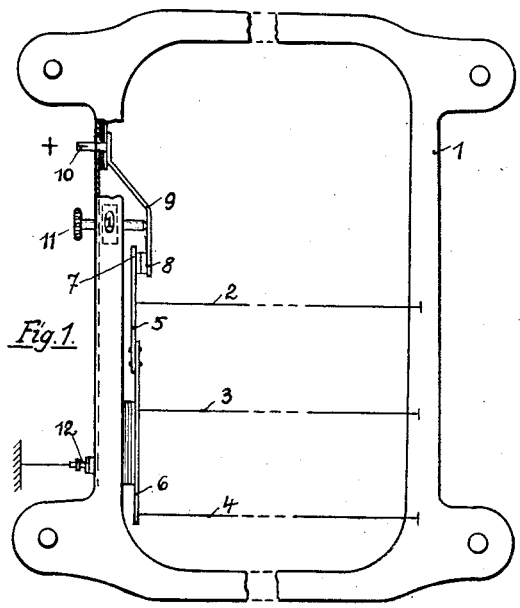
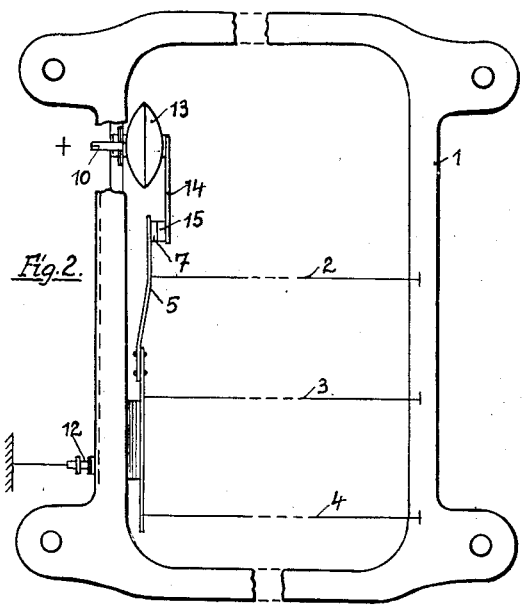
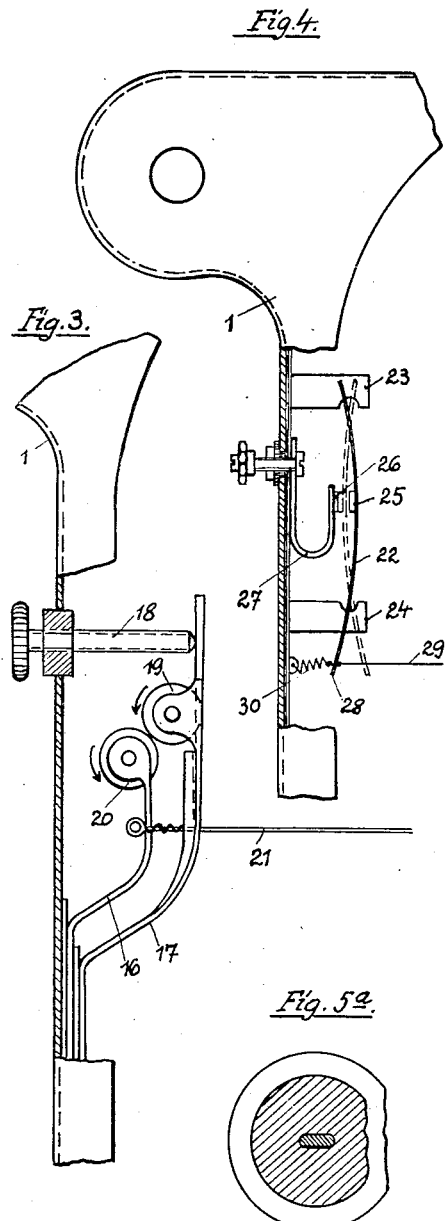
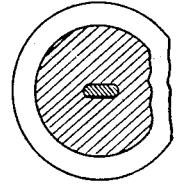
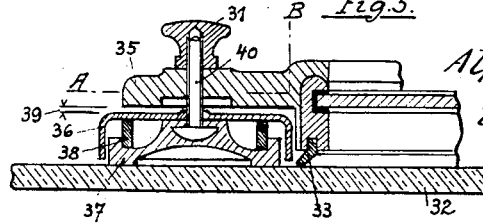
Inventor
Alfred Schwarz Dec. 14, 1937.     A. SCHWARZ     2,102,487
DEFROSTING SCREEN
Filed Sept. 27, 1935     3 Sheets-Sheet 2
Fig.6.
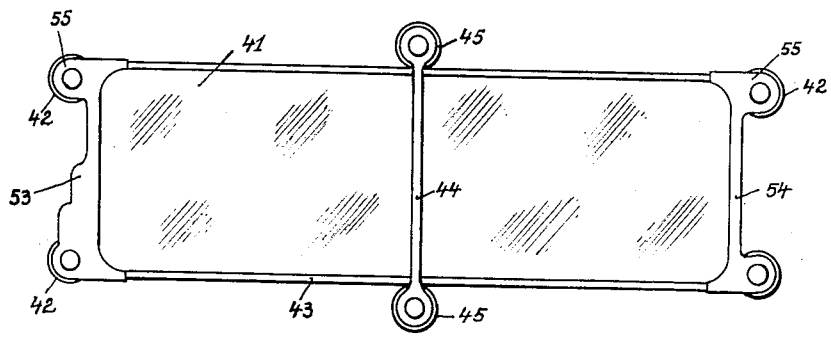
Fig.7.
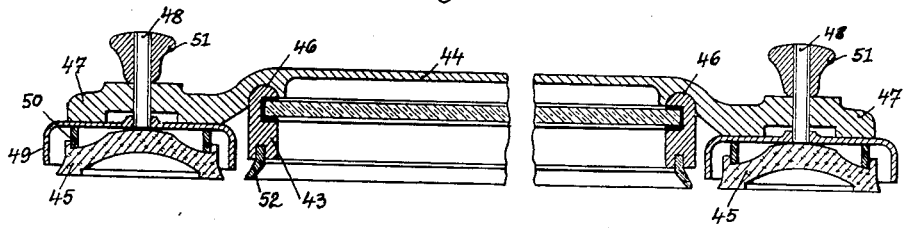
Fig.8.
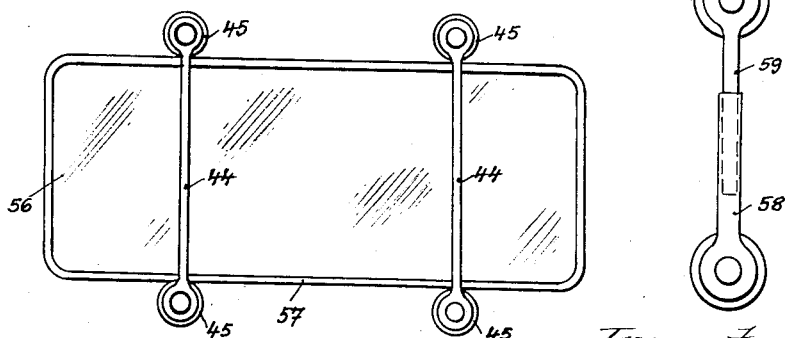
Fig.8ª.
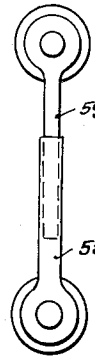
Inventor
Alfred Schwarz
By [signature]
Atty.

Dec. 14, 1937.  A. SCHWARZ  2,102,487

DEFROSTING SCREEN

Filed Sept. 27, 1935  3 Sheets—Sheet 3

Inventor
Alfred Schwarz
By
Atty.

Patented Dec. 14, 1937

2,102,487

UNITED STATES PATENT OFFICE 2,102,487

DEFROSTING SCREEN

Alfred Schwarz, Eisenach, Marienhohe, Germany; Sophie Schwarz, née Kuhlhoff, sole heir of said Alfred Schwarz, deceased, assignor to Metallwerk Alfred Schwarz, G. m. b. H., of Germany Application September 27, 1935, Serial No. 42,541
In Germany December 30, 1933

3 Claims. (Cl. 219—19)

The invention relates to a defrosting screen which is to be used for the wind-screens of power vehicles and which is provided with one or more heating wires and with a switch which automatically breaks the circuit of the heating wires in which it lies.

According to the invention one or more heating wires are attached to the movable member of a switch so that the circuit is opened by the expansion of the heating wires as a result of strong heating and closed by the contraction of the heating wires as the heat is dissipated. This automatically-acting switch device has the advantage that it brings about a saving in current and prevents harmful overloading of the heating wires. In the self-acting switch device the heating wires fulfill a double purpose since they serve as a source of heat and also control the switch automatically due to their change in length caused by heating. Preferably with the heating wires connected in parallel one wire is attached to a spring which forms the current bridge to the other heating wires and which carries a contact at its free end which when the circuit is closed comes in contact with the corresponding opposite contact. As the contact carrier one may use a bi-metallic strip which on heating bends in a direction opening the contacts. Thus the operation of the switch device is made in an advantageous way dependent also on the present temperature of the outside air or the air layer between the defrosting screen and the wind-screen and at the same time the action of the heating wires is assisted while the mechanical stress is decreased.

Preferably a special adjusting screw is provided for one of the contacts which makes it possible to fix the moment of separation of the contacts one from the other and thus the degree of the desired allowable heating temperature of the wires. With this the screw may be so arranged and formed that in its one end position it causes the permanent closure and in its other end position the permanent interruption of the current circuit.

The contacts themselves are preferably made of carbon blocks because carbon contacts increase their contact resistance with falling pressure and so with a gradual decrease of the contact pressure the resistance at the place of contact is increased and the current flow to the heating wires is restricted. On the other hand, the contacts of the self-acting switch may be formed by silver rollers.

In order to obtain an automatic switching-on of the switch device at low temperatures one of the contacts is controlled according to the invention by a deformable chamber which is filled with a substance that under the action of heat expands strongly and under the action of cold contracts strongly. With a contact controlled in this way the switching-on of the switch device follows automatically the approach of frost so that especial care and supervision of the screen is rendered superfluous. Then the use of special switches and connections for joining the defrosting screen to the current source is unnecessary as the screen may remain in permanent connection with the source of current.

The time during which the heating wires are under current with each periodic heating of the defrosting screen is fixed by the capacity for heat of the heating wires. Here a decisive factor is also the cooling of the heating wires by the air surrounding them; if it is colder the cooling of the heating wires is more rapid so that a correspondingly longer time with the current flowing through is required to heat the heating wires and the duration of the heating period is lengthened.

A tumbler or snap switch controlled by the effects of heating the wires may be used as the self-acting switch. Amongst others a spring which is stressed between two anchorages and tends to take up two extreme positions may be used, the spring being in connection with the heating wire. With such a switch breaking of the contacts is snap-like and as quick as lightning and a sufficient width of opening from the contact is obtained to prevent the formation of sparks at the contact places and thus avoid burning and wearing of the contacts. This is important with a defrosting screen because in this a frequent breaking of the contacts takes place and the formation of sparks at the contact places causes considerable wearing away of the contacts.

For attaching the defrosting screen to the wind-screen rubber suckers are preferably used which are provided with several screw ends, one of which serves for producing a vacuum and another for adjusting the defrosting screen in relation to the wind-screen. Thus one can adjust the defrosting screen relatively to the wind-screen and compensate for inequalities in the upper surface of the windscreen or in the frame of the defrosting screen.

The rubber suckers by which the defrosting screen is attached to the wind-screen need not be mounted directly on the frame of the defrosting screen but may according to the invention also be arranged on bars which are fixed over the defrosting screen about its middle and ensure that the defrosting screen sits firmly on the wind-screen.

Due to the bars the frame of the defrosting screen can be pressed against the wind-screen until the necessary tightness is obtained. The bars may be U-shaped in cross section or in the form of a T-iron or in the form of a box beam or similar shape. They grip over the frame of the defrosting screen like a claw in order to grip the frame well.

In the attached drawings the object of the invention is illustrated by exemplary constructions.

Figure 1 shows an elevation of the defrosting screen.

Figure 2 shows an elevation of a different construction of defrosting screen.

Figures 3 and 4 show various self-acting switches.

Figure 5 shows a section through an attachment point of the defrosting screen.

Figure 5a shows a section on the line A—B of Figure 5.

Figures 6 to 9 show a section and elevations of defrosting screens in which the attachment of the screen to the wind-screen is effected by means of bars.

Figure 9:
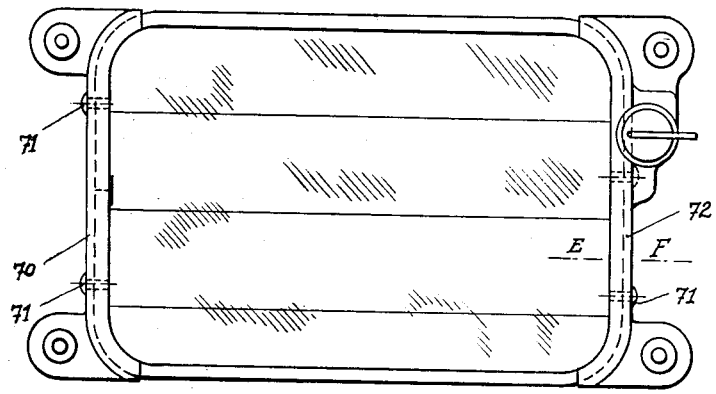

In the construction shown in Figure 1, a glass pane is held in the metal frame 1 attached to the windscreen of a vehicle for example by means of suction pads not shown in the drawing. Arranged in front of the pane are heating wires 2—4 connected in parallel to each other. The wire 2, like the wires 3 and 4 has one end in electrical connection with the frame 1; but is attached at its other end to a spring 5. This spring is attached to a bar 6 which is insulated from the frame 1 and holds the wires 3 and 4. The spring carries at its free end a contact 7, which lies against the contact 8 attached to the spring 9 when the circuit is closed. The spring 9 is carried by a push pin 10 insulated from the frame and is under the influence of a regulating screw 11, also insulated from the frame. The contact 12 of the frame 1 serves as the connection of the heating wires to the return lead or earth.

With normal heating of the wires 2—4 the contact 7 is in intimate contact with the contact 8, so that the current flows from the push pin 10 through the springs 9 and 5 and via the bar 6 through the wires and via the frame 1 and the contact 12 to earth. With too strong a heating of the wire 2 its resultant extension allows the spring 5 to become effective and to withdraw the contact 7 from the contact 8 and thus to interrupt the current flow to all wires until the cooling and thus contracting wire 2 again brings the contact 7 into contact with the contact 8 against the action of the spring 5. Besides if the contacts 7 and 8 consist of carbon, there results with the gradual reduction of the pressure between the contacts a throttling of the current flow, since with carbon contacts the contact resistance increases and decreases inversely with the contact pressure. Thus there results a much more gradual change in the strength of the current flow and in the heating effect than is the case with metal contacts which cause a sudden interruption of the current circuit.

The action of the switch arrangement can be regulated with the aid of the screw 11. Its position causes a greater or lesser pressure of the spring 9 on the contact 7, so that with the screw quite loose the contact 8 and the contact 7 are permanently together so that the current is never interrupted, or with the screw tight the contacts 7 and 8 have to remain completely separated, thus the screw could even be used as a cut off switch. The setting of the screw 11 can, with the aid of a corresponding scale, be so chosen that the heating effect obtained corresponds to the prevailing exterior temperature.

Instead of using the spring 5 as the carrier of the contact 7, use may be made of a bi-metallic strip, arranged in the same way and attached to the heating wire 2, and which on being heated bends so as to open the contacts 7 and 8. In this way the switch arrangement is brought into direct dependence on the temperature of the external air or the air layer surrounding the bi-metallic strip and at the same time the heating wire is assisted and relieved from stress, since in this case the contact 7 is returned to the closed position not only by the pull of the cooling and contracting heating wire 2 alone, but is aided by the action of the bi-metallic strip.

As a variant of the arrangement shown in Figure 1 one might well abolish the action of the extension, due to heat, of the heating wire 2 for actuating the contact by arranging the contact 7 fixed in position, and the opposite contact fixed to a bi-metallic strip which would then have to effect the opening and closing of the contacts alone. On the other hand instead of a single wire one could naturally use several heating wires to actuate the contacts.

In order to keep the switch device in permanent connection with the current source to make supervision superfluous and to effect an automatic switching-on of the device on the approach of cold, the contact 15 is arranged on a bar 14, as shown in Figure 2, which is carried and controlled by a deformable chamber 13. The deformable chamber 13, which is attached to the push pin 10, is filled with ether, amyl-alcohol or other easily-vaporized liquid or gaseous substance which on the approach of cold contracts strongly. With a high exterior temperature the contact 15 is held from the contact 7 due to the expansion of the contents of the chamber 13. If there is a considerable cooling down, as for example with frost, then the member 13 contracts so that the contacts 15 and 7 are closed and the device is automatically switched on. After the current circuit is made the actuation of the contacts caused by the heating wires continues.

It is pointed out that a switch device according to the invention need not be used solely for regulating the heating of all the wires together but may be so constructed that it only cuts out one single wire or part of the wires temporarily from the heating circuit while the other wires remain permanently in the current circuit.

On the frame 1 of the defrosting screen, according to Figure 3, two springs 16 and 17 are arranged which are insulated from the frame 1 and from each other and which are each connected to one pole of the electric current source. The spring 17 tends to press against the adjusting screw 18 and its actual position can be regulated by the adjusting screw 18. The silver rollers 19 and 20 are fixed to the springs 16 and 17. One heating wire 21 is attached to the spring. If desired instead of one heating wire 21 other heating wires could be attached to the spring 16. The heating wires 21 are drawn so tight that they flex the spring 16 towards the spring 17 so that the silver roller 20 is brought to lie against the silver roller 19. If the heating wire 21 is warmed by the current and expands, the silver roller 20 moves away from the silver roller 19 so that the current is interrupted. After the current has been broken the heating wire 21 contracts again as the result of cooling, so that the silver rollers come in contact with each other and close the circuit. Then the contacts open again due to the heating of the heating wire 21. The heating wire 21 is preferably led through an opening in the spring 17. The silver rollers receive a gradual rotary movement with the opening and closing of the contacts. In this way the surfaces of the silver rollers are kept clean and the harmful influence on the silver rollers of sparking is reduced to a minimum.

With this construction the heating wires 21 may be of a large cross section, that is to say that they may be over-dimensioned. This results in the heating wires having as great a capacity for heat as possible. The interval from current off to current on is lengthened due to this ability to take in and store up as much heat as possible.

In the tumbler switch according to Figure 4 use is made of a leaf spring 22 which is slit at its ends. Two anchorages 23 and 24 attached to the frame 1 of the defrosting screen enter the slits and are surrounded by the forked ends of the spring. The leaf spring 22 is tensioned in notches in the anchorages 23 and 24 in such a way that it can adopt two extreme positions. In the drawings the spring 22 is shown in full lines in one extreme position and in dotted lines in the other extreme position. A contact 25 is arranged on the leaf spring 22 and is in working relation with an opposite contact 26. The opposite contact 26 is attached to a spring 27 insulated from the frame 1. The heating wire 29 is attached to the end 28 of the leaf spring 22. Further a tension spring 30 insulated from the frame is connected between the end 28 and the frame 1.

When not in use the contact 25 on the leaf spring 22 lies against the contact 26 so that for switching on the current a further switch, as shown in the drawings, must be provided. When the current is switched on the heating wire 29 expands. As soon as the heating temperature or a certain length of extension of the heating wire is reached the spring 22 is brought from its position shown in dotted lines into the position shown in full lines by the action of the tension spring 30. The tension spring 30 must be strong enough to overcome the tension of the leaf spring and be able to draw the leaf spring 22 from the position shown in dotted lines into the position shown in full lines. Thus the contacts 25 and 26 are separated with lightning rapidity. The formation of sparks between the contacts in switching on and off is impossible. As soon as the contacts 25 and 26 are opened the heating wire 29 cools and contracts so that, overcoming the tension of the spring 30, it brings the spring 22 from the position shown in full lines into the position shown in dotted lines in which the contacts 25 and 26 are touching.

The closing time and opening time are influenced by the temperature. The part of the spring 22 between its end 28 and its point of abutment on the anchorage 24 forms a lever that is long enough to translate the force which the heating wires can exert so that it will move the leaf spring 22 into the contact position. A lever attached to the tumbler switch might also be used to increase the distance apart of the contact pieces when opened.

For attaching the defrosting screen to the windscreen 32 an attachment device shown in Figures 5 and 5a is used. In this a nut 31 is used together with a further nut 36 which is formed as a cap and covers the rubber sucker 37. Of the two nuts the nut 36 is used for fixing the sucker. In order that there will not be too much friction between the nut 36 and the sucker 37 in tightening it up a ring or disc 38 made of harder material than rubber, for example metal, artificial horn, or the like, is preferably placed between the nut 36 and the sucker 37. The nut 31 and the nut 36 are at first loosely screwed on the thread of the bolt 40. To attach the sucker the nut 31 is pressed down by hand and the nut 36 is tightened up by hand or by a tool on the part overhanging the attachment lips 37 until the sucker is pressed firmly against the windscreen; the position of the windscreen can then be adjusted by the nut 31. In doing this the nut 31 is tightened until the rubber edges make a good seal. The parts must be so dimensioned that the loops 35 of the defrosting screen in the tightened position are still a small distance 39 from the nut 36.

The section 5a shows that the bolt which is firmly fixed to the rubber sucker is non-circular in cross section so that it cannot be rotated about its axis, and thus the rotation of the rubber sucker is prevented.

The invention need not be used solely for defrosting screens but may be used wherever an object is to be attached or suspended from a smooth surface by means of rubber suckers. Thus the invention can, amongst other things, be used for attaching rubber suckers carrying objects to shop windows.

Figure 6 shows a very long defrosting screen having rubber suckers 42; the length of the screen corresponding approximately to that of the windscreen. A bar 44 is laid transversely over the rim 43 of the defrosting screen 41, the bar being held on the windscreen by means of the rubber suckers 45. The bar 44 is U-shaped in cross section and grips like a claw over the edge 43 of the defrosting screen; the parts 46 of the frame are, therefore, well gripped by the bar 44. The bar 44 has enlargements 47 at its ends in which the screw bolts 48, which carry rubber suckers 45, are held. A screw nut 49 is provided on each of the bolts 48. Between the nut 49 and the rubber suckers 45 a ring 50 made of hard material is provided. Each rubber sucker 45 is attached to the windscreen by means of the nuts 49. After attaching the rubber sucker 45 the bar 44 is drawn against the frame 43 of the defrosting screen by means of the nut 51. In this way it is possible, even with inequalities in the upper surface of the windscreen, to ensure that the sealing lip 52 lies closely against the windscreen.

53 and 54 are two transverse bars which carry rubber suckers 42 and which are placed over the transverse frame of the defrosting screen 41.

The enlargements 55 which are made in one piece with the parts 53 or 54 might also be made in one piece with the frame 43 of the defrosting screen 61. The enlargements 55 are the carriers of the rubber suckers 42.

In the construction shown in Figure 8 the defrosting screen 56, which has a simple frame 57, is attached by two bars 44. The attachment of the defrosting screen is made in this case entirely by the rubber suckers 45 which are attached to the bars 44.

In order that the bars 44 can be fitted to defrosting screens of various breadths each bar, as can be seen in Figure 8a, consists of two parts 58 and 59 which are fitted one inside the other and which can be fixed into the desired position relatively to each other by fixing screws or other clamping means as shown in the drawings. Thus the bars in accordance with Figure 8a can be fitted to defrosting screens of various breadths.

Figure 10:
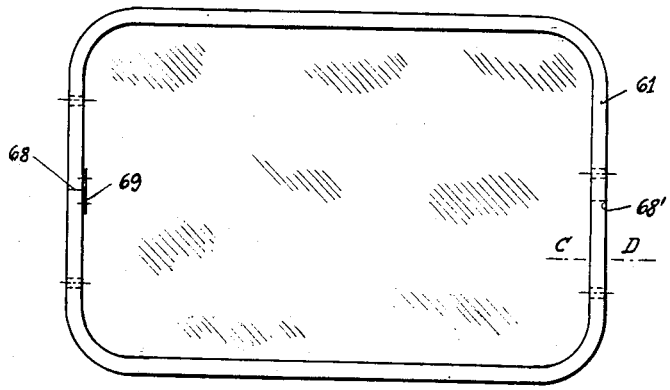
Figure 10 shows an elevation of the frame of a defrosting screen.
Figure 11:
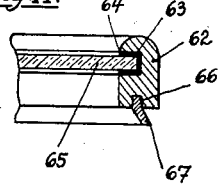
Figure 11 shows a section on the line C—D of Figure 10.
Figure 12:
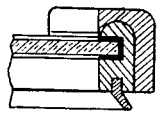
Figure 12 shows a section on the line E—F of Figure 9.

The frame 61 (Figure 11) consists of rolled light metal having a cross section as shown at 62. From this cross section it can be seen that a groove 63 is provided in the frame for housing a jointing piece 64 of U-shaped cross section and the glass pane 65. Besides this the frame has a still further groove 66 in which a rubber sealing lip 67 is inserted. The frame is bent into the form shown in Figure 10 and the two ends of the frame abut against each other at the side joint 68. The ends are connected together by a fish plate 69. This fish plate may also be omitted as the side joint 68 may be bridged over by the head piece 70 which is attached to the frame 61 by means of a screw 71. The head piece 72 is attached in a similar way to the frame 61. The construction may be so arranged that the frame consists of two pieces which abut at the joint 68 and at the other joint 68'—as shown in dotted lines. By making the frame in two parts the insertion of the glass pane in the frame is facilitated. The head pieces 70 and 72 then form the projecting parts or connecting plates for joining the parts of the frame. A switch is arranged in the head piece 72 as shown in Figure 9. The head pieces 70 and 72 are made of cast or extruded light metal or of a pressed substance or the like.

I claim:

1. A defrosting device for windshields and the like, including a wire designed to be energized for the development of heat, and a switch controlling the energization of said heating wire, said switch being opened and closed by the variations in the length of the wire incident to a heated or non-heated condition thereof.

2. A construction as defined in claim 1, wherein the contact elements of the switch are in the form of rollers, one of which is spring-influenced toward open circuiting relation to the other roller, the contraction of the heating wire moving the rollers into contact.

3. A construction as defined in claim 1, wherein the switch includes rollers as the circuiting elements, one of which is connected to the wire and spring-influenced toward open circuiting relation and the other of which is manually controlled to predetermined circuiting relations.

ALFRED SCHWARZ.